United States Patent [19]

McRoskey et al.

[11] 4,106,704
[45] Aug. 15, 1978

[54] SPREADER (BROADCAST)

[75] Inventors: John W. McRoskey; Leonard H. McRoskey, both of Los Angeles; Delbert D. Swartz, Sebastapol, all of Calif.

[73] Assignee: Republic Tool & Manufacturing Corp., Los Angeles, Calif.

[21] Appl. No.: 760,967

[22] Filed: Jan. 21, 1977

[51] Int. Cl.² .............................................. A01C 17/00
[52] U.S. Cl. .................................... 239/685; 239/687; 222/625
[58] Field of Search ............... 239/683, 685, 684, 687; 222/614, 623, 625, 560, 561, 624, 609

[56] References Cited

U.S. PATENT DOCUMENTS

| | | | |
|---|---|---|---|
| 2,687,307 | 8/1954 | Austermiller | 239/687 |
| 2,735,582 | 2/1956 | Wilson | 222/625 X |
| 2,767,887 | 10/1956 | Bond et al. | 222/625 |
| 2,817,457 | 12/1957 | Lilsenberg | 222/625 X |
| 3,394,892 | 7/1968 | Speicher | 239/685 X |
| 4,015,706 | 4/1977 | Goffredo et al. | 198/780 |
| 4,032,074 | 6/1977 | Amerine | 239/685 |

*Primary Examiner*—John J. Love
*Attorney, Agent, or Firm*—Whann & McManigal

[57] ABSTRACT

Our invention relates to a wheeled fertilizer spreader which is pushed over the area which is to be fertilized or chemically treated and in which the fertilizer, chemical or other granular material is broadcast by being dropped onto a horizontal impeller which rotates on a vertical axis and throws the material outward horizontally in a frontal direction.

10 Claims, 14 Drawing Figures

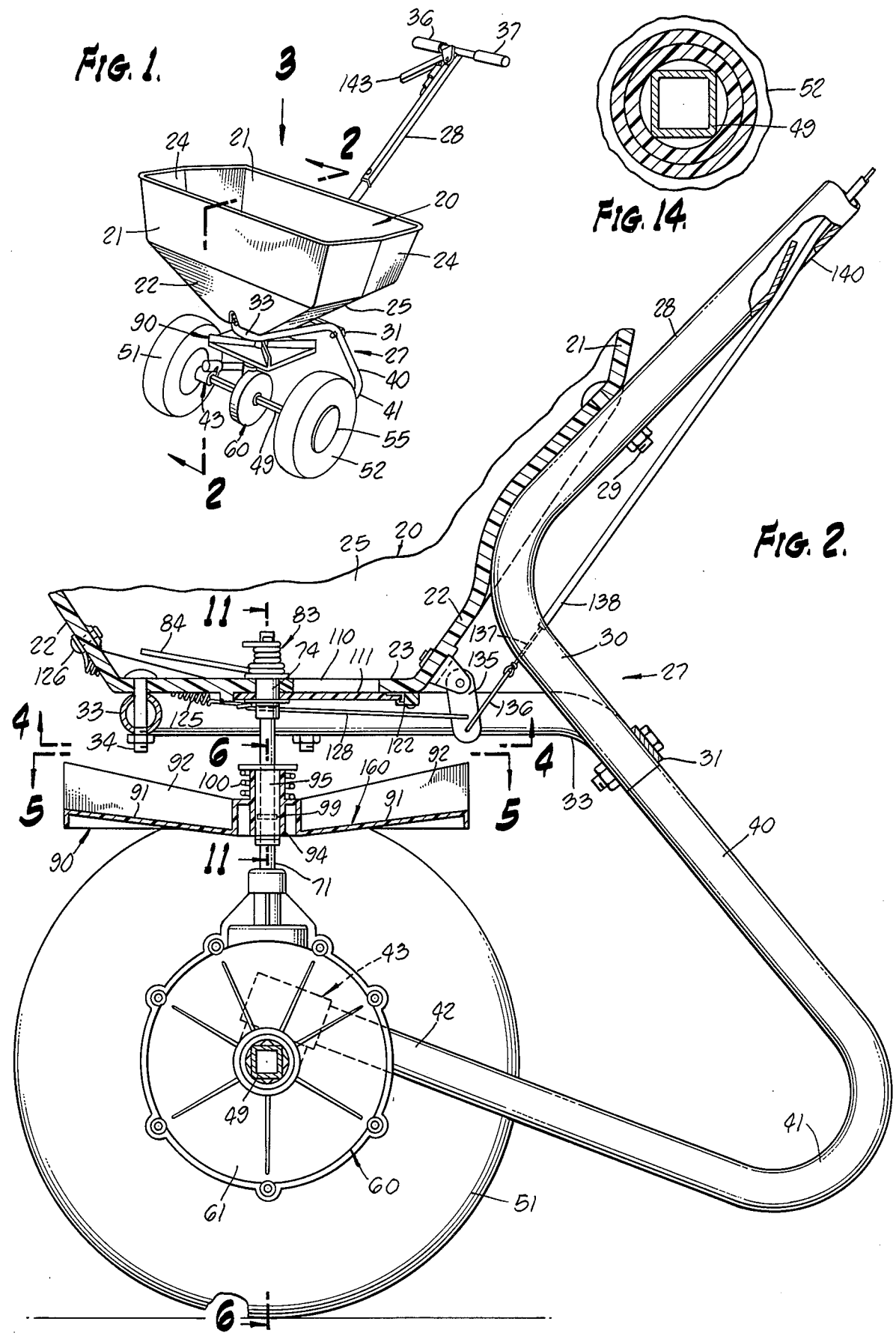

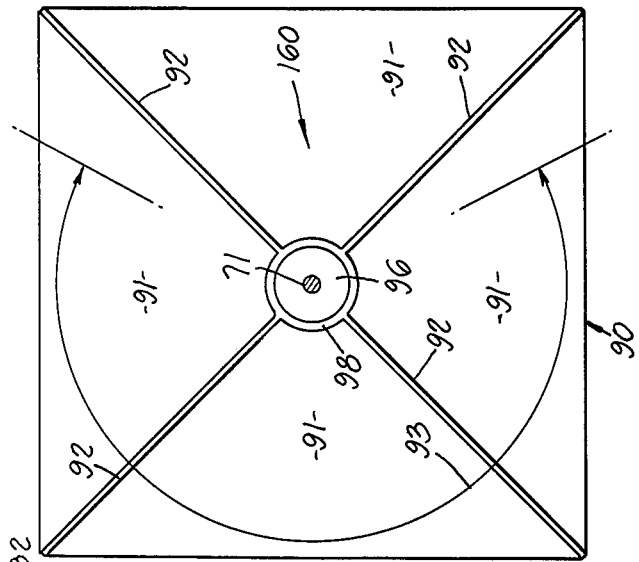
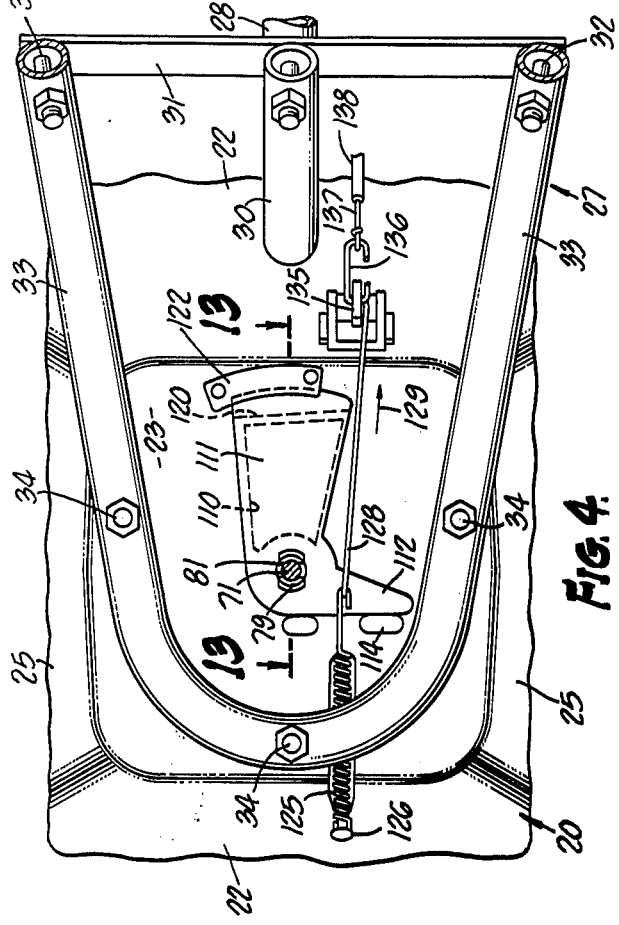
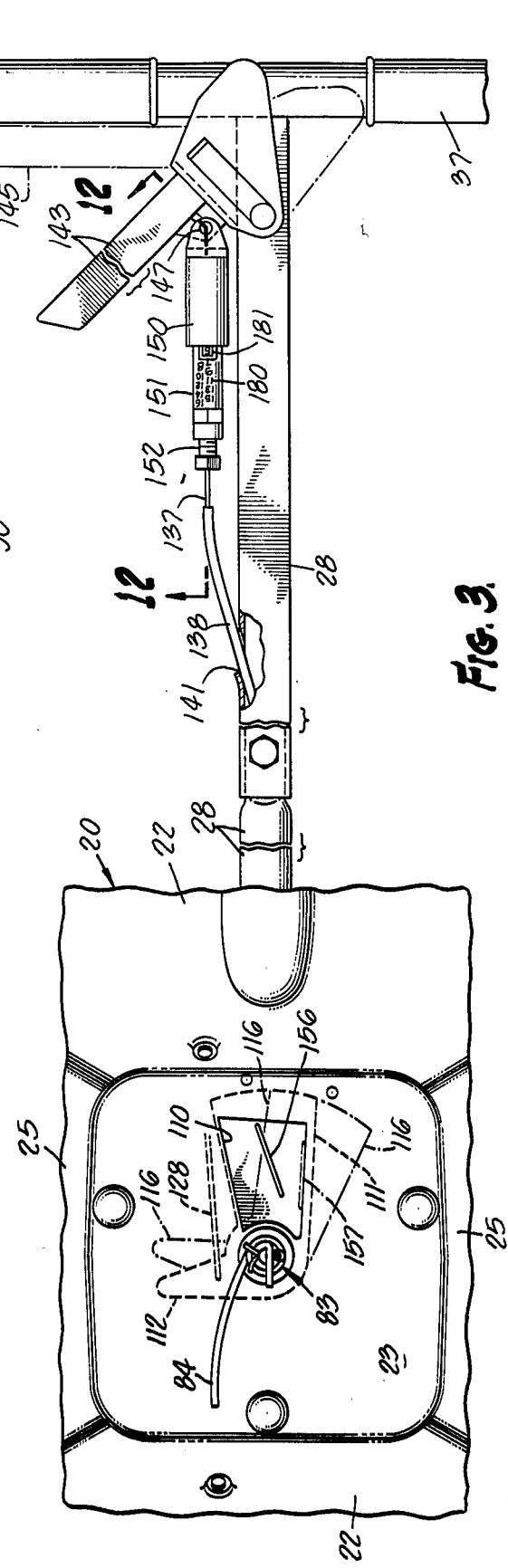

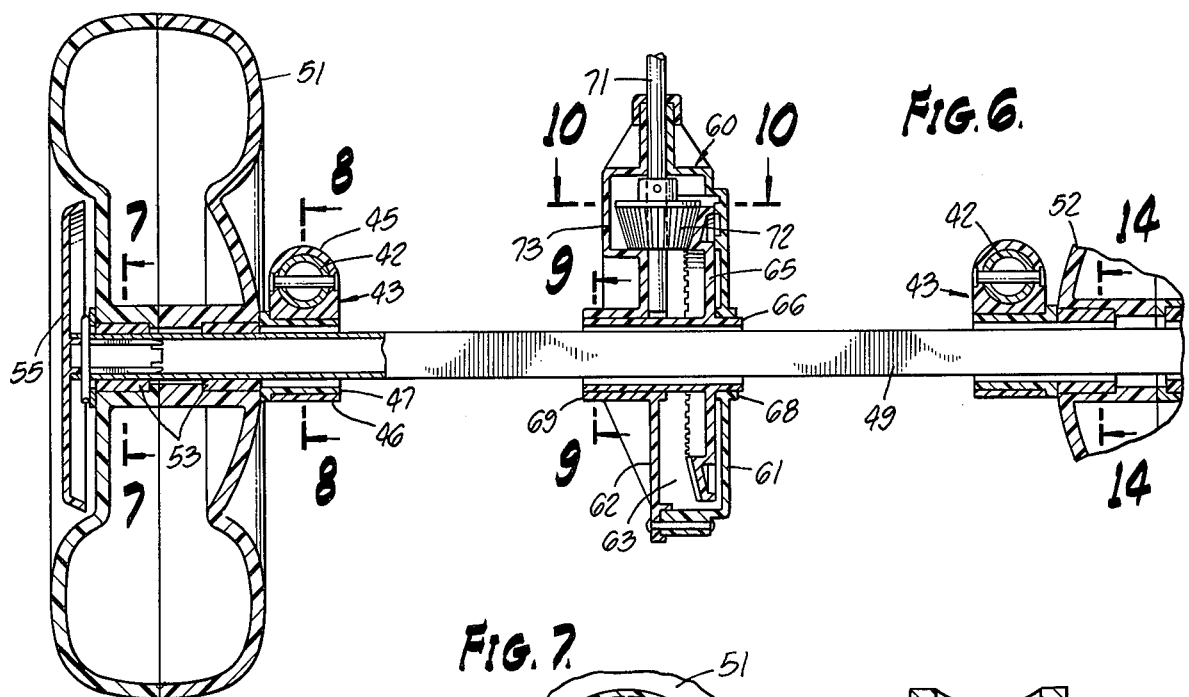
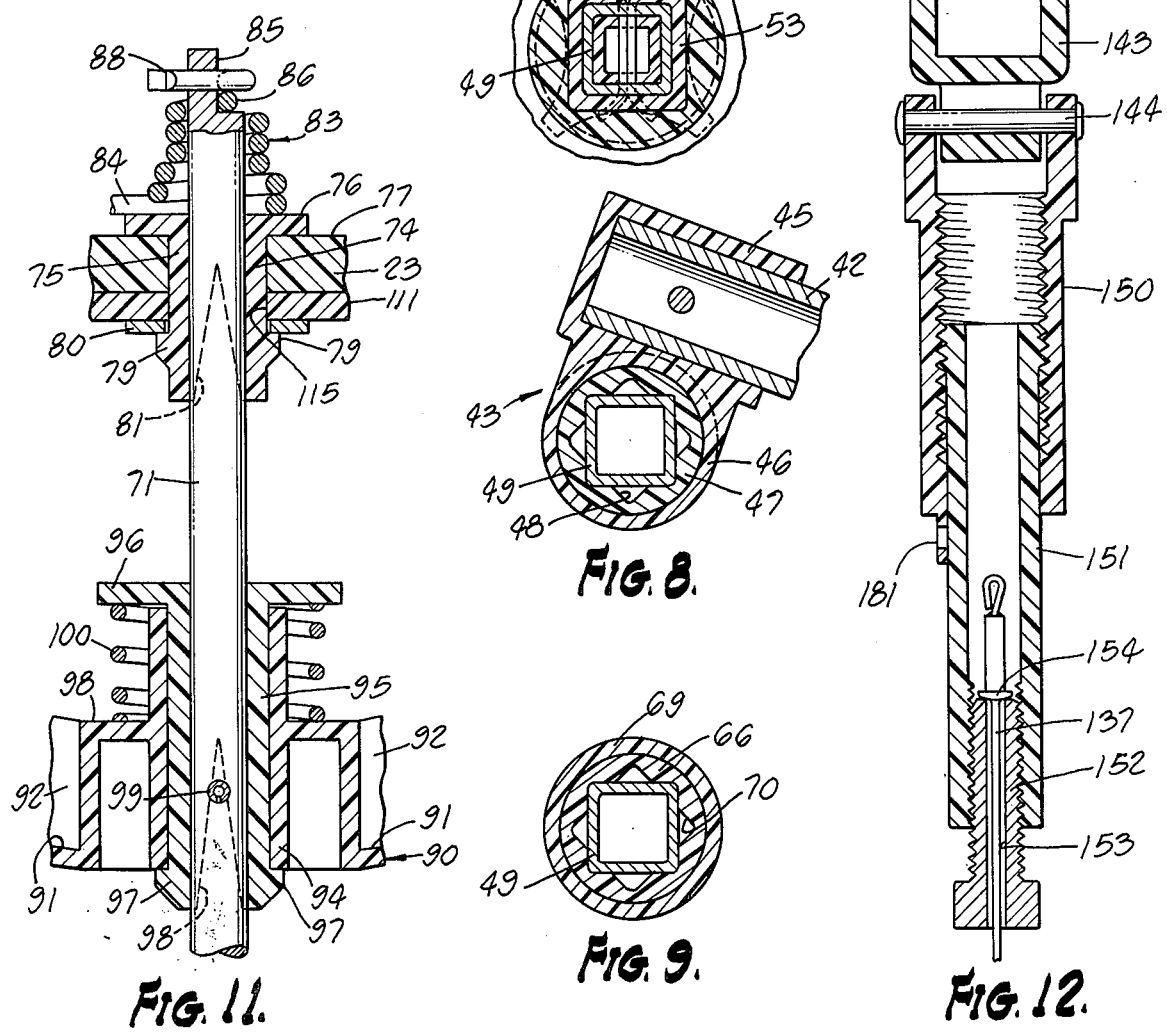

SPREADER (BROADCAST)

THE PRIOR ART

Fertilizer spreaders are old in the art and are made from metal and from plastic. It has been the general practice to ship the fertilizer spreader fully assembled. However, plastic spreaders carry a high freight rate and it is, therefore, highly desirable to have a spreader in which the parts can be shipped in subassemblies so that the parts can be packaged within cubic space or limitations which will reduce the shipping costs.

Also, in prior art structures the size of the opening through which the granular material is fed may be varied in size for volume control and this is done by the use of an adjustable stop positioned adjacent the gate which closes the feed opening of the spreader.

SUMMARY OF THE INVENTION

It is one of the objects of our invention to provide a part plastic spreader in which various subassemblies are so designed that the subassemblies are complete in themselves and can be assembled easily and quickly.

It is another object of the invention to provide a spreader of the class referred to in which there is a subassembly comprising a drive arrangement for the rotatable impeller and for the agitator which is positioned in the hopper. The parts are designed so that the driving connection to the axle embodies a gear assembly having a polygonal opening through it through which the rotatable axle extends and in which the assembly floats on the horizontal axle. The subassembly is held in lateral position by a vertical shaft which extends from the gear case and through a bearing in the bottom wall of the hopper. The bearing in the bottom of the hopper centralizes the drive unit. The subassembly is designed for easy assembly by the consumer.

It is another object of our invention to provide a spreader in which the impeller element which throws the granules horizontally outward over the area is connected to the vertical shaft of the drive assembly by means of a unique clutch arrangement whereby if the impeller or spreader is prevented from rotating by unanticipated interference, the clutch will permit the impeller to remain non-rotative while the other parts of the drive assembly can rotate, and, therefore, no damage will be done.

Spreaders have been provided in which the bottom of the hopper has a feed opening through which the material will drop onto the rotating broadcaster element. The amount of material flowing to the broadcasting element is controlled by a gate which is movable to determine the size of the opening.

It is another object of our invention to provide an arrangement of the general character just referred to but in which the gate is rotatably supported and is mounted in such a way as to reduce friction and also relieve any strains on the gate itself. This is accomplished by a unique operating means in which a spring is attached to the hopper on one side and to a wire control rod on the other side which extends up to the handle of the spreader. The metering gate is attached to the wire and, therefore, does not take any stress of the pull on the wire when the wire is moved to open the gate. In other words, the gate merely moves along with the wire, but all of the tension is delivered from the spring to the wire and vice versa. By this arrangement the nylon gate is not worn or distorted by the force of the spring.

It is another object of our invention to provide an operating lever at the handle of the spreader which must be manually engaged and moved in order to apply a pull to the gate operating wire, thus pulling on the spring and moving the metering gate into an opened position. To close the gate the operator merely releases the operating lever and the spring automatically moves the metering gate to a closed position.

The handle extends laterally from the tube which extends from the handle to the hopper end. In pushing the device one hand is applied to each handle portion. The lever which operates the measuring gate is positioned adjacent one of the handle portions so that the operator can engage the handle and also extend his fingers around the operating lever and move it into gate-opening position. The operating lever is always pulled against the handle when the gate is in "open" position.

In order to close the gate it is not necessary for the operator to remove either hand from the handle portions. All he does is to open the one hand to release the lever and the spring automatically operates to close the gate.

In this way the operator can open and close the gate at his will without removing either hand and this can be done when there is an area which is not to be treated or can be done when going around a sharp turn, which might provide an uneven distribution of the fertilizer or chemical.

This automatic nature of the closing action permits instant control of material flow, and prevents any unintended application of fertilizer when the spreader is being filled or left standing. Because the opening and closing force of the gate mechanism is "pulling" rather than "pushing", there is never a buckling or jamming of the control wire or rod.

It is another object of our invention to provide the gate operating assembly or mechanism with a calibration means adjacent to the operating lever, this adjustment includes a screw threaded element which is positioned at the handle and can be rotated in either direction so as to determine accurately and precisely the open or metering position of the metering gate for a given size or type of granule. With the adjustment located at the handle it is at a convenient position where it is easy to operate with the operator in a standing position where he can readily make the adjustment while watching the position of the metering plate.

The additional micrometer adjustment permits a ready adjustment of the metering plate into positions suitable for other type or size of granules or seeds.

It is an object of our invention to provide a combination in which the gate operating lever is positioned adjacent to the handle of the spreader and is always moved to the same predetermined position irrespective of the position of the gate in its open position.

Our invention provides adjusting means positioned between the gate and the operating handle whereby the open position of the gate is determined and by making such an adjustment moving the operating lever to an actuated position automatically determines the position of the gate.

An advantage of this arrangement is that in our invention the gate is moved and held in a closed position by a spring, and when the operating lever is moved the only pull on the wire connecting from the operating lever to the gate is that which is occasioned by the force of the spring which yieldably holds the gate in closed position.

BRIEF DESCRIPTION OF THE DRAWINGS

FIG. 1 is a perspective view showing the spreader of our invention at rest;

FIG. 2 is a vertical sectional view of the hopper and wheel portion of our invention taken on the line 2—2 of FIG. 1 showing the details of construction of a gear case and impeller assembly which constitutes one of the important features of our invention;

FIG. 3 is a view looking downward on the spreader of our invention and in the direction indicated by the arrow 3 of FIG. 1;

FIG. 4 is an enlarged fragmentary view taken along the line 4—4 of FIG. 2 and looking in an upward direction which shows the metering gate and spring and pull wire operating mechanism;

FIG. 5 is a horizontal view taken along the line 5—5 FIG. 2 showing the general shape of the impeller or spreading element;

FIG. 6 is an enlarged fragmentary view taken along the line 6—6 of FIG. 2 showing the construction of the gear case and gears which drive the impeller and showing the relationship between the axle and the frame and the wheels;

FIG. 7 is a fragmentary sectional view taken on the line 7—7 of FIG. 6;

FIG. 8 is a fragmentary sectional view showing mounting bearings for supporting the shaft and taken along the line 8—8 of FIG. 6;

FIG. 9 is a fragmentary sectional view of the gear housing hub, this view being taken along the line 9—9 of FIG. 6;

FIG. 11 is a view taken on the line 11—11 of FIG. 2 showing the details of the clutch mechanism of the impeller element and the agitator arrangement which is positioned in the hopper of the spreader;

FIG. 12 is a view showing the adjustment mechanism for the pull wire of the measuring gate, this view being taken along the line 12—12 of FIG. 3;

FIG. 14 is a sectional view taken on the line 14—14 of FIG. 6.

DESCRIPTION OF THE PREFERRED EMBODIMENTS

Figure 10:
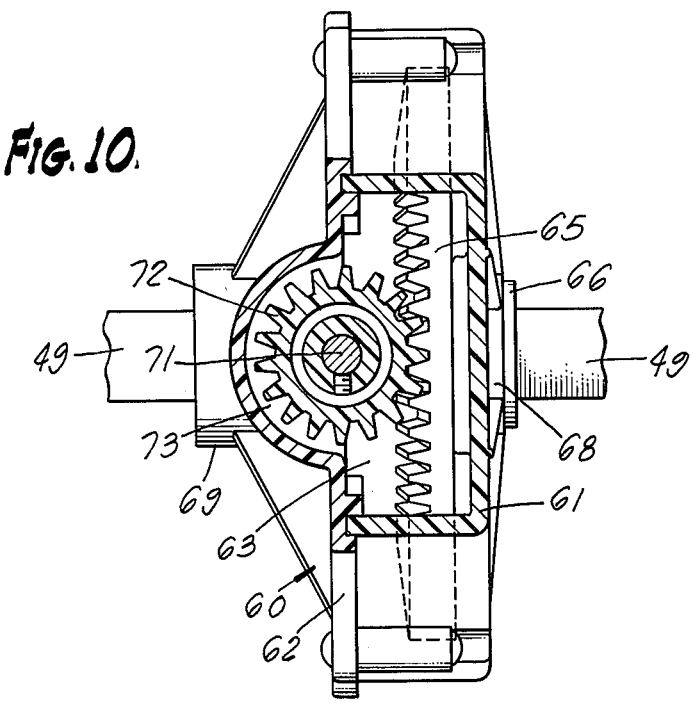
FIG. 10 is a sectional view showing a bevel gear chamber and is taken along the line 10—10 of FIG. 6.

As shown in the drawings and particularly FIGS. 1, 2 and 11, our invention provides a hopper 20 preferably made of plastic, having vertical front and rear walls 21 which are inclined toward each other as indicated at 22 and meeting at a horizontal bottom wall 23. The hopper 20 has side walls 24 which are inclined toward each other as indicated at 25 and join with the bottom 23.

The hopper is supported by a frame 27 which consists of two parts, part 28 being secured to the hopper at 29 and curved downwardly and rearwardly at 30, where it attaches to a cross-bar 31, the cross-bar being attached at 32 to the second frame member 33 which is bifurcated as shown and is secured to the lower wall of the bottom 23 as indicated by bolts 34.

The frame member 28 inclines upwardly and rearwardly and has connected to it the laterally extending handle having the hand engaging parts 36 and 37.

The bifurcated frame 33 extends downwardly and rearwardly as indicated at 40, and each bifurcation is curved at 41 and extends forwardly as indicated at 42 and carries axial support bearings or bushings 43.

The lower portion of the curved part 41 serves as a skid or rest which supports the spreader in the position shown in FIG. 1. When the spreader is in use the handle is engaged and raised and moves the whole assembly into a vertical position with the skid being raised above the ground surface as shown in FIG. 2.

Each bearing fixture 43 has a sleeve portion 45 into which a frame portion 42 is extended. Below this is a cylindrical bearing 46 which supports a rotatable bushing 47 having a polygonal opening 48 which receives the horizontally extending square cross-sectioned axle 49.

Wheels 51 and 52 are supported on the ends of the axle 49, the wheel 51 being driven by the axle through bushings 53, whereas the wheel 52 is freely rotatable so that the axle 49 is driven only by one wheel which permits the spreader to be readily moved around a curve and relatively sharp corners.

The ends of the axle 49 are provided with cover plates 55 which are principally for decorative purposes.

Our invention provides an impeller drive assembly which is shown best in FIGS. 2, 6 and 11. The drive assembly includes a gear drive having a casing or housing 60 which consists of two parts comprising a body 61 and a cover 62 which provide a gear chamber 63. There is a bevel ring gear 65 having a horizontally positioned hub 66 which is rotatable within bearing flanges 68 and 69 of the parts 61 and 62. As shown in FIG. 9, the hub 66 has an octagonal cross-sectioned horizontal opening 70 which receives the axle 49. The hub 66 floats on the axle 49. The relative sizes of the hub opening and axle are such that the hub of the ring gear 65 is readily slidable onto the axle 49, and other than sliding the assembly into place there is no attachment in addition to the driving relationship between the square cross-sectioned axle and the octagonal section opening of the hub.

When the spreader is pushed forwardly the wheel 51 rotates the axle 49 which, in turn, rotates the beveled ring gear 65. Mounted on the lower end of a shaft 71 is a beveled pinion gear 72 which rests in the enlargement 73 of the chamber 63, as shown in FIG. 10.

The ring gear 65 drives the pinion 72 which rotates the vertical shaft 71. As shown best in FIGS. 2 and 11, the shaft 71 extends upwardly through a bearing 74 which extends through an opening 75 in the bottom 23 of the hopper.

Bearing 74 has an upper radially extending flange 76, which engages an upper surface 77 of the bottom 23. The bearing 74 is held in place by shoulders 79 which engage the washer 80. The bearing has two V-shaped slots 81. The bearing 74 is made of plastic, and, therefore, can be inserted in place by forcing through the lower end of the bearing so that the shoulder 79 will be moved inwardly and can move through the opening 75. When the bearing is passed through the opening 75 into the position shown in FIG. 11 the lower ends thereof will then move outwardly into the position shown.

The upper end of the shaft 71 receives an agitator 83 which is in the form of a coiled spring having an agitator arm 84 which extends outwardly as shown in the lower part of FIG. 3. The upper end of the shaft is cut away to provide a flat side 85 engaged by the spring as indicated at 86 and the parts are held in place by a cotter key 88. When the shaft 71 is rotated the agitator arm 84 rotates thus agitating the fertilizer or chemical or other granular material which is positioned in the area above the bottom 23.

Mounted on the shaft 71 is an impeller 90 having square horizontal but slightly sloping walls 91 and radial vertical vanes 92. The impeller is rotated and flings the fertilizer or chemical outwardly in a casting area indicated by the line 93 of FIG. 5.

The impeller has a cylindrical hub 94, as shown in FIG. 2, and in the enlarged view of FIG. 11. The hub 94 fits on a cylindrical support sleeve 95 which has a flange 96 at one end and shoulders 97 at the other end, as in the case of the bearing 74. The lower end of the support 95 has a pair of V-slots 98 which permit the lower end of the support to be moved inwardly so that the shoulders 97 will pass through the opening of the hub 94 and be released into the position shown in FIG. 11, the flange 96 engaging the upper end of the hub at this time so that the impeller 90 will be rotatable but not axially movable.

The shaft has pins 99 which engage in the slots 98 and hold the support 95 from axial movement. Compressed between the horizontal wall 98 of the impeller 90 and the flange 96 is a spring clutch 100. In normal operation the spring provides enough friction to cause the impeller to be driven by the support, but in the event of interference with the rotation of the impeller the clutch will slip, permitting the impeller to remain non-rotative yet permit the shaft 71 to rotate without damage to any of the parts.

The bottom 23 has a feed opening 110 which is of a shape indicated by the dotted line 110 of FIG. 4. There is a measuring or metering gate 111 for closing or opening the feed opening 110. This measuring gate includes the plate 111 and an operating arm 112 which engages stops 114 when the measuring gate closes the opening 110. As shown in FIG. 11, the measuring gate has an opening 115 and is rotatably supported on the bearing 74 between the lower wall of the bottom 23 and the upper surface of the washer 80.

The measuring gate is movable from the closed position as shown in full lines in FIG. 4 and by dotted lines in FIG. 3 into an open position as indicated by dot and dash lines 116 in FIG. 3.

Figure 13:
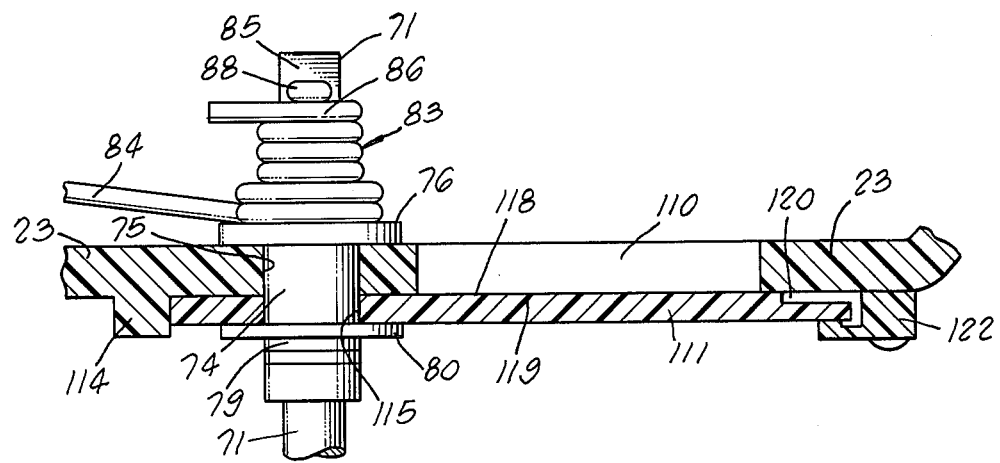
FIG. 13 is a view taken along the line 13—13 of FIG. 4 and showing the relationship between the measuring gate and the hold-down member therefor.

In order to reduce friction and to prevent clogging, the co-engaging surfaces are reduced to a minimum. This is accomplished by forming the gate with a surface 118, as shown in FIG. 13, which engages the bottom surface 119 of the bottom 23. The gate, however, is relieved, as indicated at 120 of FIG. 13, so that the overlap at the edge of the opening 110 is reduced to a minimum. In order to hold the gate portion 111 in contact with the surface 119 there is a holddown plate 122 which overlaps the relieved end of the gate 111, as shown, to provide a minimum of co-engaging surfaces yet adequate to hold the gate 111 in a position against the surface 119 to prevent material from clogging between the surface 118 and 119, which could prevent accurate measuring or metering of the material passing through the opening 110 and to prevent clogging.

For the purpose of holding the measuring gate closed there is a spring 135 secured to the bottom of the hopper at 126 secured to a pull link 128, comprising a part of an operating member, which pull link is also secured to the arm 112. When the pull link 128 is pulled rearwardly, as indicated by the arrow 129 of FIG. 4, the measuring gate is moved into an open position, as indicated by the broken lines 116 of FIG. 3. It will be noted that the tension or pull of the spring 125 is taken directly by the pull rod 128 and not through the arm 112.

The pull link 128 is connected to the lever 135 and the lever 135 is connected by a "C" connection 136 to pull wire 137 which extends upwardly through the flexible tube 138. The wire 137 and tube 138 enters the frame member at 140 and exits from the frame member 28 at 141.

Connected to the upper end of the frame bar 28 adjacent to the handle portions 36 and 37 is an operating lever 143 pivoted at 144 and movable into broken line position 145 adjacent the handle part 36. The operating means for the gate is so designed that when the gate is in "open" position the operating lever 143 is always held against the handle part 36. Pivotally connected at 147 to the operating lever 143 is an internally threaded socket 150 into which a numerical setting element 151 is threaded. The numerical setting element 151 has a series of measuring gate position indicia 180 which will be explained in further detail later, and the socket 150 has a window 181 through which one of the indicia appears, depending upon the adjusted position of the numerical setting element 151. Where the word "numerical" is used it is intended that it be broadly construed to cover "numbers" or other indicia. Threaded to the numerical setting element 151 is a calibration element 152. The upper end of the pull wire 137 is extended through opening 153 of the calibration element 152 and the inner end of the pull wire is provided with the stop 154.

The purpose of the numerical setting element is to vary the amount of gate-opening to accommodate the required rates of feed of different size and weight granular material. The purpose of the calibration element is to insure that at any given numerical setting on the numerical setting element a proper amount of gate opening is achieved.

In FIG. 3 there is shown a calibration means described as follows: The top of the gate 111 is provided with a calibration line 156. To make a calibration adjustment the operating lever 143 is moved into the position 145 which swings the gate into an open position. If the calibration line 156 does not occupy a position adjacent to the wall of the opening as indicated by broken line 157, the calibration element is adjusted to bring the calibration line 156 into the broken line position.

Calibration at the factory or in the field is accomplished as follows:

First numerical setting element 131 is set so that the numerical 4½ is read through the window 181. The operator then engages the operating lever 143 and moves it to the position indicated by dotted lines 145. In this position the measuring gate is in an open position. When the setting is at the numeral 4½ the calibration line 156, as shown in FIG. 3, should be in the position shown by dotted lines 157. If the calibration line is not at position 157 the calibration element 152 is then rotated in the proper direction to position the calibration line 156 exactly in the dotted line position.

When this is done the measuring gate is then in the proper open position for use of the spreader in applying certain granular material to the surface, for example, with a setting of No. 4½ Ortho Grow Lawn Food 22-4-4 or Ortho Grow Weed and Feed 21-4-4.

Now when other type or size of granular material is to be applied the first adjustment numerical setting element 151 can be rotated to bring any one of other indicia into the window 181. For example, when Ortho Lawn Food 24-4-8 is being spread over the surface, setting No. 5 is the correct setting. For Ortho Crab Grass Control plus Lawn Food 18-3-6, 5½ is the proper setting. Weed killers or chemicals, etc. require a different indicia setting ranging from 3 to 11 or more. A setting guide is provided with each spreader.

It will be seen that after the calibration line has been adjusted into the right position for numeral 4½ there is no need to further touch the calibration element 152. All that is required is to adjust the numerical setting element to bring the proper indicia number into the window area 181.

The term "granular" or "granular material" is intended to apply to all granular material including fertilizers, seeds, chemicals or whatever other material is desired to spread over the surface.

The control of the measuring gate is done at the handle where the operating lever is engaged by the operator. When it is desired to feed material through the feed opening the operator engages one of the handle parts 37 with one hand and the other handle part 36 with the other hand and in order to open the gate he extends his fingers down around the operating lever or takes his hand and moves the operating lever into the position 145 and then clamps the two together with the lever against the handle as he moves the spreader forwardly.

It is an important part of our invention to provide a combination in which the operating lever is always pulled into a predetermined position against one of the handle points in order to move the gate into open position. Since the gate must have different open positions for different granular materials it is necessary, as explained, to change the open position of the gate. This adjustment is made by changing the length of the connection between the operating lever and the gate. Thus, the operating lever is always pulled into its predetermined position and the gate position is thus automatically determined.

Also, it is an important part of our invention to provide an arrangement in which the only force applied to the connections between the operating lever and the gate is the force of the spring which at all times exerts a force tending to close the gate. In this way there is a minimum of force applied to the operating mechanism and there, therefore, is little likelihood of any stretching of parts which would cause a misadjustment and there is never any concern on the part of the operator as to how fast or how hard he squeezes the operating lever against the handle.

If it is desired to stop the flow of granules from the hopper this can be done by the operator without moving either hand from the pushing handles. This would be done where the device is pushed over an area that is not to be treated or in going around curves or corners where no treatment is desired.

Another important feature of the invention is that the load of the spring when the pull wire is pulled to open the gate, the pull of the pull link is directly on the spring 125 and the measuring gate merely goes along with it. This is important because the tension of the spring is greatly increased when it is stretched and if the pull of the stretched spring were directly on the arm 112 it would place a strain on this plastic part and might cause distortion.

The total operation of our invention is briefly related as follows: the hopper, of course, is at least partly filled with the granular material which is to be spread. This may be fertilizers, chemicals, seeds, weed killers or any material of granular form which is to be spread over a lawn or other area.

The operator engages the handle portions 36 and 37, raises it upwardly to remove the skids from engagement with the ground and as he starts to push the spreader forward he moves the operating handle from full line position into broken line position as shown at 145.

As the operating lever is moved into the operating position, which opens the gate as previously described, the operator pushes forwardly on the spreader which rotates the wheels 51 and 52 which, in turn, rotate the axle 49. Through the gears 65 and 72 the shaft 71 is rotated. This rotates the agitator 84 to loosen the granular material so that it will freely move down through the feed opening 110, onto the wall 91 of the rotating impeller element at a position indicated at 160. Centrifugal force throws the granular material outwardly and it leaves the plate principally along one of the vertical vanes 92. The area of the surface which is covered is through the angular distance indicated by the line 93. Thus it will be seen that the casting area is forwardly of the spreader.

With two hands engaging the handle portions 36 and 37 there is an easy balance to the device and the gate can be opened and quickly closed as required without disengaging either of the hands from the pushing handles 36 and 37.

We claim:
1. A spreader of the class described, comprising:
   (a) a hopper adapted to contain a granular material to be applied to a surface;
   (b) a feed opening through which said granules are discharged from said hopper;
   (c) a metering gate for closing or opening said feed opening;
   (d) operating means for said metering gate, including a spring connected to said hopper and said metering gate for exerting a pull on said metering gate to close same; and
   (e) an operating member connected to said spring and said metering gate whereby a pull on said operating member will transfer the pulling force to said spring without said force being transmitted through said metering gate.

2. A combination as defined in claim 1, in which said metering gate has an arm to which said spring and operating means are attached so that when said metering gate is moved to open position the tension of the spring is transferred directly to said operating means.

3. A combination as defined in claim 1, in which said metering gate has an arm and is pivoted so that the swinging of said arm moves said metering gate and in which said spring and operating means is connected to said arm.

4. A spreader of the class described, comprising:
   (a) a hopper adapted to contain a granular material to be applied to a surface;
   (b) a feed opening through which said granules are discharged from said hopper;
   (c) a metering gate for closing or opening said feed opening;
   (d) operating means for said metering gate, including a spring connected to said hopper and said metering gate for exerting a pull on said metering gate to close same;
   (e) an operating member connected to move said metering gate from its closed position;

(f) a handle extended from said hopper whereby said spreader may be moved over a surface;

(g) an operating lever positioned adjacent said handle which is always moved into a predetermined position to open said gate; and (h) a first adjusting means and a second adjusting means connected in series between said operating lever and said operating member, said first adjusting means enabling the setting of said metering gate to alternative open positions to obtain the required rates of feed of different materials, and said second adjusting means permitting calibration of said metering gate to insure that on any given setting of said measuring gate on said first adjusting means a proper amount of gate opening is achieved.

5. A combination as defined in claim 4, in which said first adjusting means has a series of indicia and in which any one of said indicia can be brought into setting position by adjusting said first adjusting means.

6. A combination as defined in claim 4, in which a threaded connection element is connected to said operating lever, a first adjustment means threadedly connected to said connection element, and a second adjusting means threadedly connected to said first adjusting means, said operating means being connected to said second adjusting means whereby movement of said operating lever moves said measuring gate into an open position.

7. A spreader of the class described, comprising:
(a) a hopper adapted to contain a granular material to be applied to a surface;
(b) a feed opening through which said granules are discharged from said hopper;
(c) a metering gate for closing or opening said feed opening;
(d) a handle connected to said hopper having a hand engaging part;
(e) operating lever pivoted adjacent said hand engaging part;
(f) operating means connected between said operating lever and said metering gate;
(g) a spring acting through said operating means to hold said operating lever in metering gate closed position, said operating lever being movable by the hand of the operator to move same against the action of said spring to open said metering gate, said spring moving said metering gate to closed position upon release of said operating handle; and
(h) means between said metering gate and said operating lever whereby the open position of said gate may be varied, said operating lever always moving to a predetermined position to open said gate.

8. A spreader of the class described comprising:
(a) a hopper adapted to contain a granular material;
(b) a feed opening through which said granules are discharged from said hopper;
(c) a metering gate for closing or opening said feed opening;
(d) manual operating means;
(e) connecting means connecting said measuring gate to said manual operating means;
(f) an indicia setting element connected to said manual operating means and said connecting means for changing the effective length of said connecting means whereby the open position of said measuring gate may be changed to accommodate different materials;

(g) indicia means associated with said indicia setting element operable upon adjustment of said indicia setting element, said indicia means having indicia for indicating different gate opening positions, one of said indicia being a calibration indicia;

(h) calibration means cooperating between said measuring gate and a stationary part of said spreader, said calibration means having a calibration setting position; and (i) a calibration element also connected to said connecting means which is adjustable to shorten or lengthen said connecting means in order to bring said calibration means into calibration position when said calibration indicia is in indicating position.

9. A spreader of the class described, comprising:
(a) a hopper adapted to contain a granular material to be applied to a surface;
(b) a feed opening through which said granules are discharged from said hopper;
(c) a metering gate for closing or opening said feed opening;
(d) operating means for moving said metering gate between closed and opened positions;
(e) wheel and axle means for rendering said spreader portable over the surface to be treated, said axle being rotated when said spreader is moved over said surface;
(f) a vertical shaft positioned below said hopper;
(g) an impeller mounted on said shaft and being rotatable to broadcast the granular material passing downward from said feed opening; and
(h) a preassembled drive unit adapted to be mounted, as a separate preassembled unit, in said spreader, said drive unit including:
(1) a housing having a chamber into which the lower end of said shaft extends,
(2) a driven gear in said housing, and attached to said shaft,
(3) a drive gear in said housing, said drive gear meshing with said driven gear in order to rotate said shaft to rotate said impeller,
(4) bearing means in said housing for supporting said drive gear to rotate on a substantially horizontal axis,
(5) said unit being positioned below said hopper with the upper end of said shaft positioned as previously stated whereafter said axle is extended through an axial opening in said drive gear for driving same, and
(6) said unit being centralized by said vertical shaft and said unit being supported on said axle so as to be axially movable thereon.

10. A spreader of the class described, comprising:
(a) a hopper adapted to contain a granular material to be applied to a surface;
(b) a feed opening through which said granules are discharged from said hopper;
(c) a metering gate for closing or opening said feed opening;
(d) operating means for moving said metering gate between open and closed positions;
(e) wheel and axle means for rendering said spreader portable over the surface to be treated, said axle being rotated when said spreader is moved over said surface;
(f) a vertical shaft positioned below said hopper;

(g) an impeller mounted on said shaft and being rotatable to broadcast the granular material passing downwardly from said feed opening; and (h) a preassembled gear unit assembly adapted to be assembled into said spreader structure, said unit including
  (1) a supporting housing from which said vertical shaft extends,
  (2) a driven gear on a portion of said shaft within said housing,
  (3) a drive gear rotatably supported in said housing to mesh with and to drive said driven gear,
  (4) said driving gear having a horizontal opening through which said axle extends, said drive gear being axially slidable but non-rotatable on said axle,
  (5) said preassembled gear unit being held in vertical alignment with respect to said hopper, by the engagement of said shaft in a wall of said hopper, said preassembled gear unit having freedom of axial movement on said axle.

* * * * *